(12) United States Patent
Hashimoto

(10) Patent No.: US 8,213,043 B2
(45) Date of Patent: Jul. 3, 2012

(54) PRINTING APPARATUS, PRINTING APPARATUS CONTROL METHOD, PRINTING APPARATUS CONTROL PROGRAM, AND PRINTING SYSTEM

(75) Inventor: Kiyoshi Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 701 days.

(21) Appl. No.: 12/390,316

(22) Filed: Feb. 20, 2009

(65) Prior Publication Data
US 2009/0213398 A1 Aug. 27, 2009

(30) Foreign Application Priority Data
Feb. 21, 2008 (JP) ................................. 2008-040393

(51) Int. Cl.
*H04N 1/40* (2006.01)
(52) U.S. Cl. ........................ 358/1.18; 358/468; 358/296
(58) Field of Classification Search .................... 358/1.9, 358/2.1, 1.3, 1.16–1.18, 498, 468, 296, 3.28
See application file for complete search history.

(56) References Cited

U.S. PATENT DOCUMENTS
| 7,202,965 B2 * | 4/2007 | Korn ............................ 358/1.15 |
| 2009/0122350 A1 * | 5/2009 | Alverson et al. ............. 358/3.28 |

FOREIGN PATENT DOCUMENTS
| JP | 2004284250 A | * 10/2004 |
| JP | 2005-244802 A | 9/2005 |

* cited by examiner

*Primary Examiner* — Thomas D Lee
*Assistant Examiner* — Stephen M Brinich
(74) *Attorney, Agent, or Firm* — Kilpatrick Townsend & Stockton LLP

(57) ABSTRACT

A printing apparatus includes: a tag information reading/writing unit which reads information from an IC tag attached to or embedded in a predetermined location of a print medium and writes information to the IC tag through wireless communication with the IC tag and which reads layout information, which defines at least a location of a printable area on the print medium, from the IC tag; a record data inputting unit which inputs record data representing contents recorded on the print medium; and a printing control unit which performs a printing process on the print medium on the basis of print target data in which a print location of the contents represented by the record data is determined on the basis of the layout information and which updates the layout information on the basis of information directly or indirectly representing a printed area in the print medium subjected to the printing process and allows the tag information reading/writing unit to write the layout information subjected to the updating process to the IC tag.

8 Claims, 11 Drawing Sheets

FIG. 8

```
                                    D1
<?xml version="1.0" encoding="UTF-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
        <title>Patent sample</title>
        <style type="text/css">

@page    {
                 size: 210mm 297mm;        D2
                 margin: 0mm;
                 } body {
                 line-height: 1.0;
                 padding: 0px;
                 font-size: 10pt;
                 }

D3    .area_1     { position: absolute; top:  10mm; left:  10mm; width: 90mm; height: 120mm; }
        .area_2     { position: absolute; top:  10mm; left: 110mm; width: 90mm; height: 120mm; }
        .area_3     { position: absolute; top: 150mm; left:  10mm; width: 90mm; height: 120mm; }
        .area_4     { position: absolute; top: 150mm; left: 110mm; width: 90mm; height: 120mm; }

</style>
</head>
<body>
        <div  class="area_1">
                <span class="area_1"><!---character---!> </span>
        </div>
        <div  class="area_2">
                <img class="area 2"    src="photo.jpg"/>
        </div>
        <div  class="area_3">
                <img class="area_3"    src="graph.gif"/>
        </div>
        <div  class="area_4">
                <span class="area_4"><!---character---!> </span>
        </div>

</body>
</html>
```

FIG. 11

```
                                      D1'
<?xml version="1.0" encoding="UTF-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
        <title>Patent sample</title>
        <style type="text/css">

@page   {
                size: 210mm 297mm;
                margin: 0mm;
                } body {
                line-height: 1.0;
                padding: 0px;
                font-size: 10pt;
                }

.area_1     { position: absolute; top:  10mm; left:  10mm; width: 90mm; height: 120mm; }
        .area_2     { position: absolute; top:  10mm; left: 110mm; width: 90mm; height: 120mm; }
        .area_3     { position: absolute; top: 150mm; left:  10mm; width: 90mm; height: 120mm; }
        .area_4     { position: absolute; top: 150mm; left: 110mm; width: 90mm; height: 120mm; }

</style>

</head>
<body>                                                                        D4
        <div  class="area_1">
                <span class="area_1"><!...character...!></span>  #done
        </div>
        <div  class="area_2">
                <img class="area_2"        src="photo.jpg"/>     #done
        </div>
        <div  class="area_3">
                <img class="area_3"        src="graph.gif"/>
        </div>
        <div  class="area_4">
                <span class="area_4"><!...character...!></span>
        </div>

</body>
</html>
```

PRINTING APPARATUS, PRINTING APPARATUS CONTROL METHOD, PRINTING APPARATUS CONTROL PROGRAM, AND PRINTING SYSTEM

CROSS-REFERENCES TO RELATED APPLICATIONS

This application claims priority to Japanese Patent Application No. 2008-040393, filed Feb. 21, 2008, the entire disclosure of which is expressly incorporated by reference herein.

BACKGROUND

1. Technical Field

The present invention relates to a printing apparatus, a printing apparatus control method, a printing apparatus control program, and a printing system.

2. Related Art

There was known a print sheet on which a printable area in which a user can perform printing is restricted by performing specific printing performed in advance in some areas of a sheet surface. For example, a sheet for a class of a memorandum book in which lines or specific character strings are printed in advance or a sheet for a photo album (hereinafter, referred to as a print sheet having lines and frames) in which a frame defining a print location of a photo is printed in advance correspond to the print sheet. When the user prints characters (for example, a user's schedule), photos, or CGs on the print sheet by use of a printer, the user sets the print sheet having lines and frames in the printer and operates a user interface (UI) screen or the like of a PC controlling the printer to set which contents (such as characters, photos, or CGs) are printed at which location on the print sheet.

There was known a printing image processing system which prohibits copy in each area where an IC tag storing output prohibition information is embedded, when an image printed on a print sheet in which one IC tag is embedded in each area divided in a net-like shape is scanned and copied (see JP-A-2005-244802).

When a desired printing process is performed on the print sheet having lines and frames, the user needs to operate the UI screen to set a print location setting process of clearly printing characters, photos, or the like at the locations of lines or within frames or to set the appropriate number of characters, for example. However, these operations are very troublesome for the user and it is difficult for the user that is not familiar with an operation of the UI screen to carry out these operations. Moreover, there was known a printer that has a character synthesis function of allowing character data transmitted from an information terminal such as a cellular phone by a user to be superimposed on a specific location of an image at the time of printing the image. However, when this character synthesis function is used, the user cannot select any template except for templates (which are templates defining a location where characters are synthesized into the image) stored in advance in a memory in the printer before product shipment. For this reason, the user could not synthesize the characters into the image by use of a layout desired to be used by the user.

According to JP-A-2005-244802, a work necessary for a layout process of print contents in a printing process is not reduced.

SUMMARY

An advantage of some aspects of the invention is that it provides a printing apparatus, a printing apparatus control method, a printing apparatus control program, and a printing system capable of printing print contents exactly on a print medium, and considerably reducing a user's burden of a user-preferred layout (arrangement).

According to an aspect of the invention, there is provided a printing apparatus including: a tag information reading/writing unit which reads information from an IC tag attached to or embedded in a predetermined location of a print medium and writes information to the IC tag through wireless communication with the IC tag and which reads layout information, which defines at least a location of a printable area on the print medium, from the IC tag; a record data inputting unit which inputs record data representing contents recorded on the print medium; and a printing control unit which performs a printing process on the print medium on the basis of print target data determining a print location of the contents represented by the record data on the basis of the layout information and which updates the layout information on the basis of information directly or indirectly representing a printed area in the print medium subjected to the printing process and allows the tag information reading/writing unit to write the layout information subjected to the updating process to the IC tag.

According to the aspect of the invention, the printing apparatus performs the printing process by selecting the locations of the contents (characters, photos, CGs, or the like) represented by the record data on the basis of the layout information read from the IC tag of the fed print medium. Therefore, it is possible to easily obtain the print result in which the characters or the like are exactly arranged on the print medium selected arbitrarily by a user. Moreover, the layout information of the IC tag is updated in every printing process. Therefore, when the printing process is again performed on the print medium subjected to the printing process, contents associated with new record data can be printed in areas other than the printed areas.

The tag information reading/writing unit may read the layout information containing some or all of the number of the printable areas, an attribute of each of the printable areas, and an amount of printable data in each of the printable areas. The printing apparatus may further include a display processing unit which performs a predetermined display process of instructing input of the record data on the basis of the layout information read by the tag information reading/writing unit on a predetermined display screen. With such a configuration, the printing apparatus displays an instruction of inputting the record data on the display screen on the basis of the layout information. Therefore, a user that views this display can input the record data of the number or the contents conforming to the layout information (for example, the number of the printable areas, the attribute of each of the areas, and the amount of printable data on each of the areas) to the printing apparatus.

The display processing unit may display an image representing the printable areas on the print medium on the basis of the layout information, and in response to an instruction of selecting an area inside the display screen, the display processing unit additionally displays some or all of the attributes of the selected areas and the amounts of the printable data. With such a configuration, the user can easily recognize where the printable areas on the present print medium are located and know detailed information (the attribute of the areas or the amount of printable data on the area) on the selected area. Therefore, the record data to the printing apparatus can be more appropriately supplied.

The tag information reading/writing unit may be provided at a predetermined location on a movement passage of the print medium which includes an initial location of the print medium and a print start location of the print medium in the printing apparatus. With such a configuration, the printing apparatus can acquire the layout information stored in the IC tag during transmission of the print medium from the initial location to the print start location.

The record data inputting unit may input record data transmitted from an external information terminal through wireless communication with the external information terminal. With such a configuration, the printing apparatus can perform the printing process on the basis of the record data transmitted from the information terminal such as a cellular phone.

The technical spirit of the invention is understandable in the invention other than the printing apparatus described above. That is, according to another aspect of the invention, there are provided a printing apparatus control method including processes performed by the constituent units of the printing apparatus and a printing apparatus control program casing the printing apparatus (or a computer provided in the printing apparatus) to carry out functions realized by the constituent unit of the printing apparatus. In addition, according to still another aspect of the invention, there is provided a printing system including: a print medium in which an IC tag allowing a predetermined memory to store layout information defining at least a location of a printable area in the print medium is attached to or embedded in a predetermined location; and a printing apparatus including a tag information reading/writing unit which reads information from the provided IC tag and writes information to the IC tag through wireless communication with the IC tag and which reads the layout information from the IC tag, a record data inputting unit which inputs record data representing contents recorded on the print medium, and a printing control unit which performs a printing process on the print medium on the basis of print target data determining a print location of the contents represented by the record data on the basis of the layout information and which updates the layout information on the basis of information directly or indirectly representing a printed area in the print medium subjected to the printing process and allows the tag information reading/writing unit to write the layout information subjected to the updating process to the IC tag. The printing system may further include the information terminal as a constituent unit. Moreover, the print medium in which the IC tag is embedded may be embodied as one aspect of the invention.

BRIEF DESCRIPTION OF THE DRAWINGS

The invention will be described with reference to the accompanying drawings, wherein like numbers reference like elements.

FIG. 5 is a block diagram illustrating the functional configurations of a printer and the like.

FIG. 8 is a diagram illustrating an example of layout information.

FIG. 11 is a diagram illustrating an example of updated layout information.

DESCRIPTION OF EXEMPLARY EMBODIMENTS

An embodiment of the invention will be described with reference to the drawings.

Figure 1:
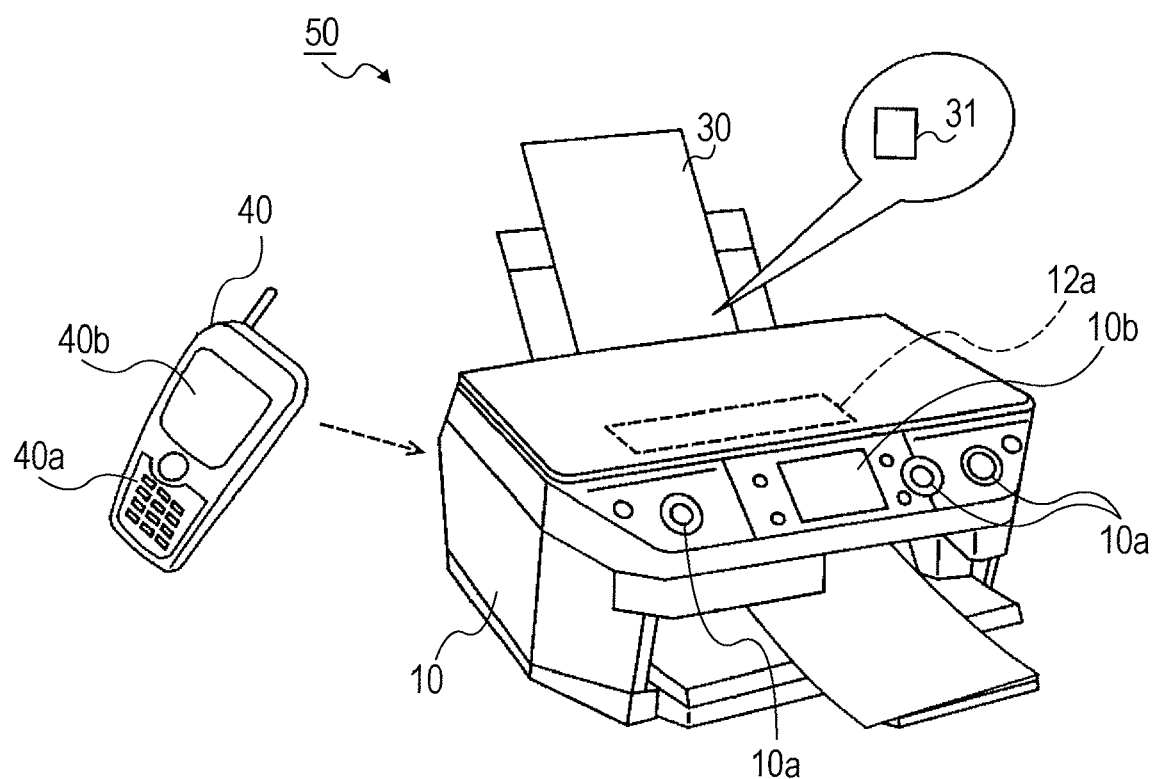
FIG. 1 is a diagram illustrating an appearance example of a printing system.

FIG. 1 is a diagram simply illustrating the appearance of a printing system 50 according to this embodiment. The printing system 50 includes a printer (printing apparatus) 10 and a print sheet (print medium) 30. The printer 10 may be a multi-function type printer which has a scanning function, a copy function, a printing (label printing) function of performing printing on the surface of predetermined disk type media (CD-R or DVD), a backup storing function of storing data recorded in a predetermined memory card or the like to the disk type media in addition to a printing function (including a so-called direct printing function). The printer 10 includes an input receiving unit (a button, a touch panel, or the like) 10a as a user interface (UI) and a screen 10b.

When the print sheet 30 is supplied to the printer 10, the print sheet 30 is sent from a location (initial location) for supplying the print sheet 30 to a print start location in a predetermined sheet feeding direction by a sheet feeding mechanism 22a (see FIG. 5) provided in the printer 10 and is printed from the print start location. An IC tag 31 is attached to or embedded in a predetermined location on the print sheet 30. The IC tag 31 includes an IC chip or an IC chip antenna. As described below, information (for example, layout information) on the print sheet 30 is recorded in advance in a memory 31a inside the IC chip. Hereinafter, the information recorded in advance in the memory 31a is called tag information D.

The printer 10 include a reader/writer 12a which reads information from the IC tag 31 at a predetermined inside location and writes information to the IC tag 31.

Figure 2:
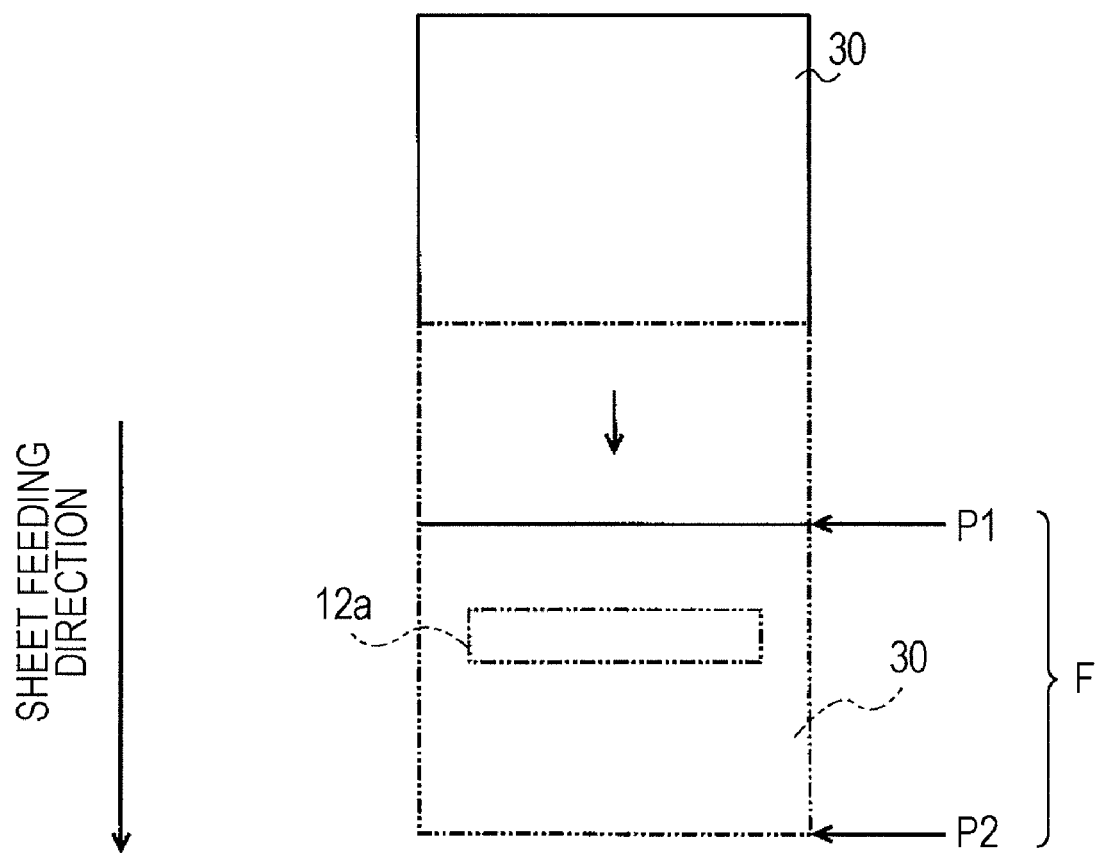
FIG. 2 is a diagram simply illustrating a location relation between a print sheet and a reader/writer.

FIG. 2 is a diagram simply illustrating a location relation between the print sheet 30 and the reader/writer 12a inside the printer 10. In this embodiment, the reader/writer 12a is disposed at a predetermined location on a movement passage F of the print sheet 30 which includes an initial location P1 of the print sheet 30 and a print start location P2 for the print sheet 30 inside the printer 10. With such a configuration, in the printer 10, the reader/writer 12a can read tag information D from the IC tag 31, while the user sets the front end of the print sheet 30 so as to match with the initial location P1 and then the front end of the print sheet 30 is fed up to the print start location P2.

Figure 3:
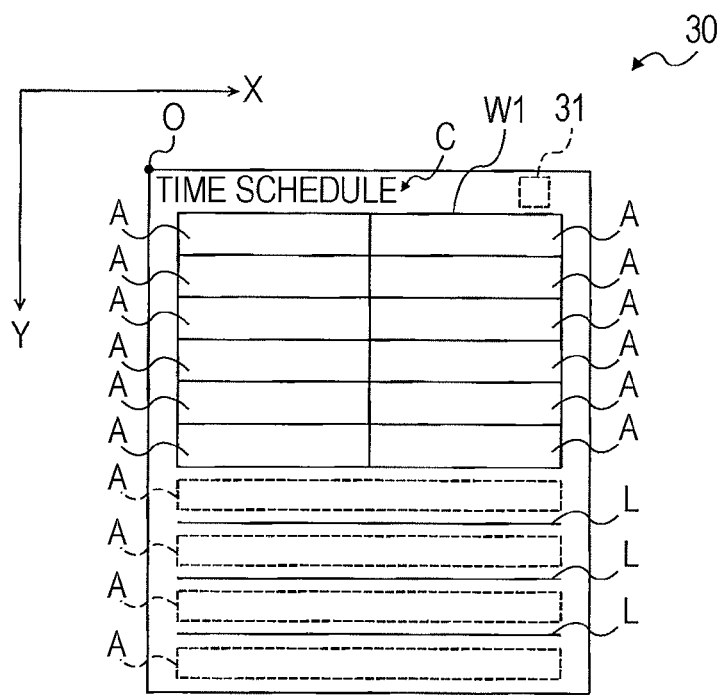
FIG. 3 is a diagram illustrating an example of the print sheet.
Figure 4:
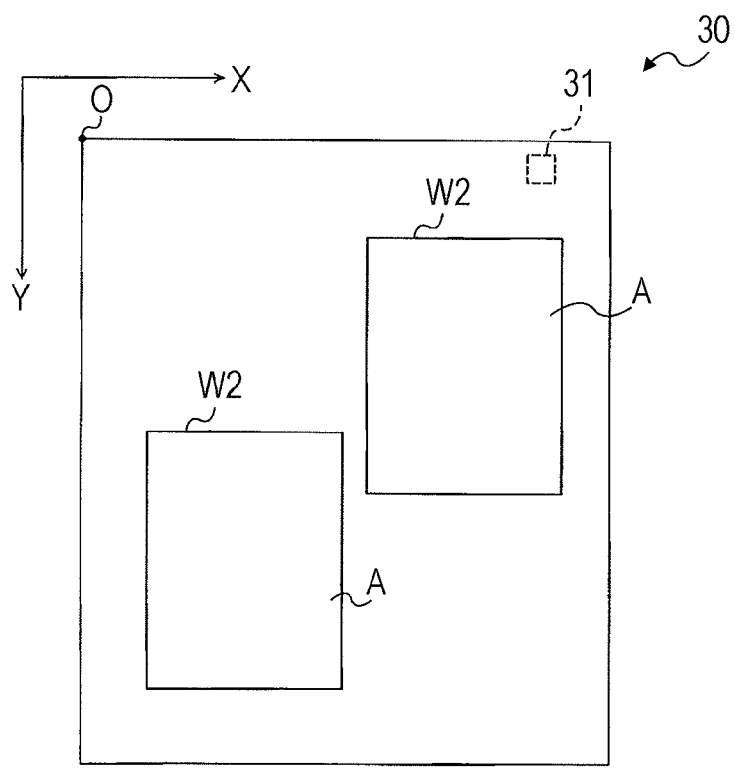
FIG. 4 is a diagram illustrating another example of the print sheet.

FIGS. 3 and 4 are diagrams illustrating an example of the print sheet 30. The print sheet 30 shown in FIG. 3 is an example of a page of a schedule book. Characters C, lines L, a frame W1, and the like are printed in advance on one page. On this print sheet 30, print areas A partitioned by the lines L and the frame W1 are present. In addition, the print sheet 30 shown in FIG. 4 is an example of a page of a photo album. Frames W2 are printed in advance on one page. On this print sheet 30, print areas A partitioned by the frames W2 are present. The print sheets 30 shown in FIGS. 3 and 4 correspond to a print sheet having lines and frames and both have an IC tag 31 in this embodiment. Layout information recorded in advance in the IC tag 31 of the print sheet 30 shown in FIG. 3 contains location information and the like on the areas A partitioned by the lines L and the frame W1 within the print sheet 30. Likewise, layout information recorded in advance in the IC tag 31 of the print sheet 30 shown in FIG. 4 contains location information and the like on the areas A partitioned by the frames W2 within the print sheet 30. In this case, the print sheet 30 may not necessarily be the print sheet having lines and frames, but may be a print sheet including at least the IC tag 31 at a predetermined location thereon, and the location information on a printable area on the print sheet is recorded in the IC tag 31.

In FIG. 1, an information terminal 40 is also illustrated. As one of constituent elements of the printing system 50, the information terminal 40 may be included. As an example of the information terminal 40, a cellular phone is illustrated in FIG. 1. The information terminal 40 is provided with an input receiving unit (a button, a touch panel, or the like) 40a as the user interface (UI) and a screen 40b. In this case, the information terminal 40 may be a terminal having a function of transmitting and receiving data to and from the printer 10 through wired communication or wireless communication. In this embodiment, the user allows transmitting record data presenting contents (character, photos, CGs, or the like) desired to be printed by use of the printer 10 from the information terminal 40 to the printer 10.

Figure 5:
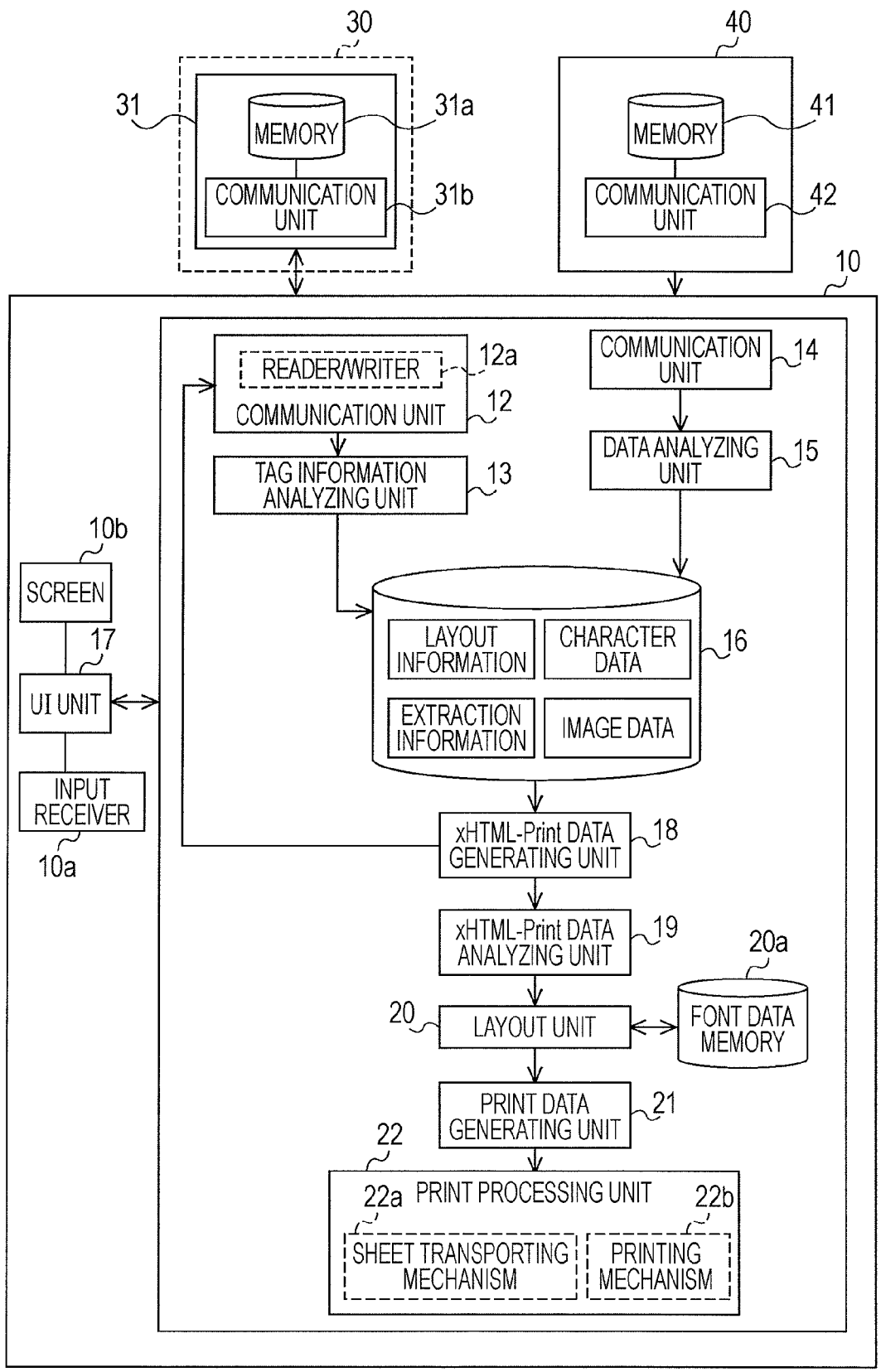

FIG. 5 is a block diagram illustrating functions of the printer 10, the print sheet 30 (IC tag 31), and the information terminal 40. The IC tag 31 includes a memory 31a and a communication unit 31b. The communication unit 31b is realized by an IC chip and antenna. The information terminal 40 includes a memory 41 and a communication unit 42. The memory 41 records character data such as text data, or image data which express photos or CGs. The communication unit 42 is a communication unit which transmits and receives data to and from another information terminal or the printer 10 through infrared communication. In this case, the information terminal 40 also has various functions of a general cellular phone such as a telephone function or a function of transmitting and receiving electronic mails, in addition to the configuration shown in FIG. 5.

The printer 10 includes a communication unit 12 which allows the reader/writer 12a to carry out wireless communication with the IC tag 31 by control of the reader/writer 12a and a tag information analyzing unit 13 which analyzes the tag information D received by the communication unit 12 (the reader/writer 12a) to extract predetermined information. In this embodiment, the reader/writer 12a carries out wireless communication with the IC tag 31 in accordance with a non-contact communication standard called a NFC (Near Field Communication) standard, when the reader/writer 12a approaches the IC tag 31. In the NFC standard, communication is carried out by an electromagnetic induction method. That is, the reader/writer 12a induces electric power to the antenna of the IC tag 31 by flowing current to the antenna of the reader/writer 12a to generate electromagnetic field. The communication unit 31b of the IC tag 31 obtained the electric power by the electromagnetic field can write information transmitted from the reader/writer 12a to the memory 31a or reads the tag information D recorded in the memory 31a to transmit the read tag information D to the reader/writer 12a. The reader/writer 12a and the communication unit 12 correspond to a tag information reading/writing unit.

The printer 10 includes a communication unit 14 which carries out communication (for example, infrared communication) with the communication unit 42 of the information terminal 40; a data analyzing unit 15 which extracts the character data or the image data from data received by the communication unit 14; a memory 16; an xHTML-Print data generating unit 18 which generates xHTML-Print data on the basis of the layout information and each data extracted by the data analyzing unit 15; an xHTML-Print data analyzing unit 19 which analyzes the generated xHTML-Print data; a layout unit 20 which generates dot data representing a print image on the basis of the result analyzed by the xHTML-Print data analyzing unit 19; a font data memory 20a which stores font data used appropriately by the layout unit 20; a print data generating unit 21 which converts the dot data generated by the layout unit 20 into print data; and a print processing unit 22 which performs a printing process on the basis of the print data by control of the sheet feeding mechanism 22a and a printing mechanism 22b. The communication unit 14 corresponds to an example of a record data inputting unit. The xHTML-Print data generating unit 18, the xHTML-Print data analyzing unit 19, the layout unit 20, the print data generating unit 21, and print processing unit 22 correspond to examples of a printing control unit. The dot data and the record data correspond to print target data in which a print location of contents represented by the record data on the basis of the layout information.

The sheet feeding mechanism 22a is a mechanism which feeds the print sheet 30 in the sheet feeding direction or in a direction reverse to the sheet feeding direction and includes a sheet feeding roller. The printing mechanism 22a includes a print head which receives ink from ink cartridges, for example, to eject the ink, a print head driving circuit which controls the ink ejection of the print head, and a carriage which moves the print head. The printer 10 includes a UI unit 17. The UI unit 17 which is connected to the input receiving unit 10a and the screen 10b analyzes an external instruction received through the input receiving unit 10a to transmit the analyzed instruction to each unit of the printer 10 and controls display contents on the screen 10b. Each unit of the printer 10 is a functional unit realized by allowing a main control unit (a CPU or the like) (not shown) of the printer 10 to execute a predetermined program (printing apparatus control program) stored in a predetermined memory inside the printer 10. The UI unit 17 and the screen 10b correspond to examples of a display processing unit.

Figure 6:
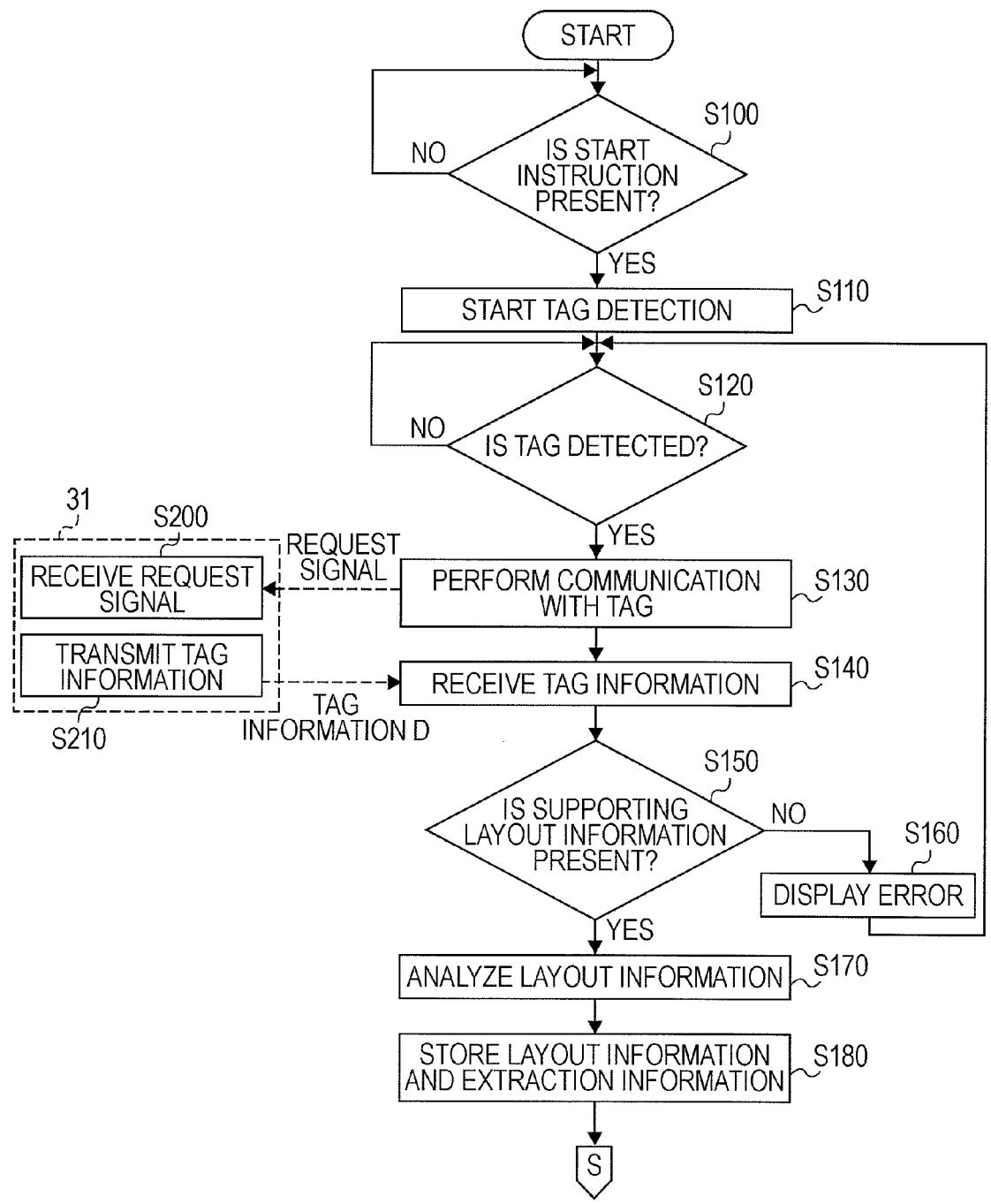
FIG. 6 is a flowchart illustrating some steps of a printing process according to an embodiment.
Figure 7:
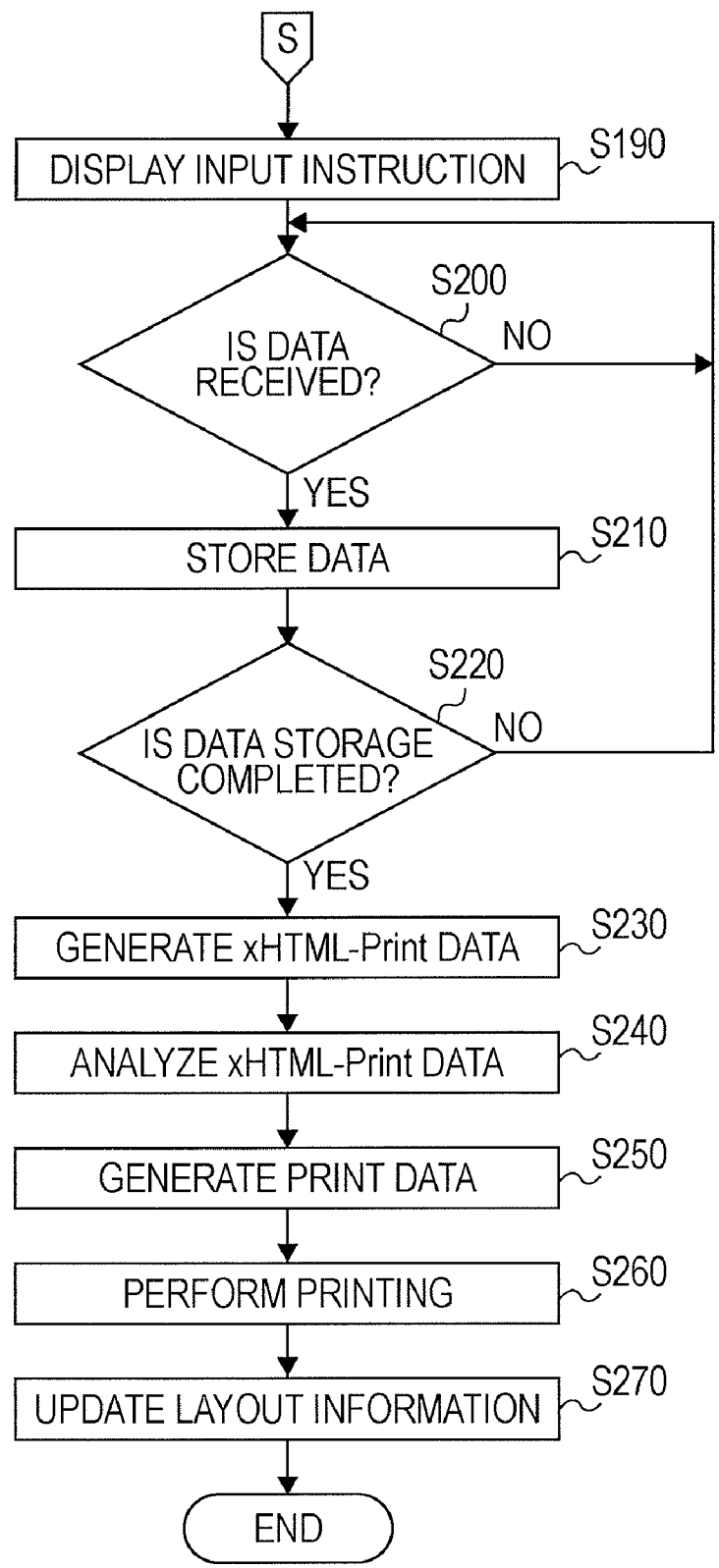
FIG. 7 is a flowchart illustrating some steps of a printing process according to the embodiment.

FIGS. 6 and 7 are a flowchart illustrating a printing process performed by the printer 10 and the like. According to the flowchart, the printing apparatus control program is executed.

In Step S100 (hereinafter, the term Step is omitted), the printer 10 determines whether a predetermined start instruction is received. When it is determined that the start instruction is received, the process proceeds to S100 and the subsequent steps thereof. Here, the start instruction corresponds to an instruction to start a sheet feeding process input to the printer 10 by the user or an instruction to start a printing process input to the printer 10 by the user. That is, when the UI unit 17 recognizes the input of the start instruction from the user through the input receiving unit 10a, the printer 10 starts processes described below. Basically, the user sets the front end of the print sheet 30 to the initial location P1 of the printer 10, operates the input receiving unit 10a, and then gives the start instruction to the printer 10.

In S110, the printer 10 starts to detect the IC tag 31. At this time, the printer 10 detects the IC tag 31 along with a process of sending the print sheet 30 set at the initial location P1 to the print start location P2. A method of detecting the IC tag 31 is not particularly limited. For example, the printer 10 includes a sensor for detecting the IC tag 31 in the vicinity of the reader/writer 12a and allows the sensor to detect whether the IC tag 31 is present during feeding the print sheet 30. Alternatively, the communication 12 of the printer 10 allows the reader/writer 12a to transmit a specific signal requesting a reply to the IC tag 31 at a constant interval and detects whether the IC tag 31 is present by determining whether the reply of the specific signal is received (when the reply is received, it is determined that the IC tag 31 is present and when the reply is not received, it is determined that the IC tag 31 is not present).

In the printer 10, when the detection process on the IC tag 31 succeeds ("Yes" in S120), the process proceeds to S130. Alternatively, when the detection process on the IC tag 31 does not succeed ("No" in S120), the printer 10 continues to detect the IC tag 31. In this case, when the detection process is performed during certain time but the detection process on the IC tag 31 does not succeed, the UI unit 17 may display a predetermined error message (for example, a message indicating that "AN IC TAG IS NOT DETECTED") on the screen 10b.

In S130, the communication unit 12 allows the reader/writer 12a to initiate wireless communication with the IC tag 31 and transmit a request signal requesting transmission of the tag information D to the IC tag 31. In FIG. 6, processes performed by the IC tag 31 are illustrated in S200 and S210. That is, the communication unit 31b of the IC tag 31 having received the request signal in S200 reads the tag information D recorded in the memory 31a S210 and transmits the read tag information D to the reader/writer 12a.

As described above, the reader/writer 12a is disposed at the predetermined location on the movement passage F of the print sheet 30 including the initial location P1 and the print start location P2. Therefore, the reader/writer 12a may be disposed in the vicinity of the initial location P1. When the reader/writer 12a is disposed in the vicinity of the initial location P1 and the IC tag 31 is disposed in the vicinity of the front end of the print sheet 30, the printer 10 detects whether the print sheet 30 is set to the initial location P1 at normal time. When it is detected that the print sheet 30 is set at the initial location P1, the IC tag 31 may be detected before transmission of the print sheet 30 and the tag information D may be acquired by carrying out wireless communication with the detected IC tag 31.

In S140, the communication unit 12 allows the reader/writer 12 to receive the tag information D, and transmits and receives the received tag information D to and from the tag information analyzing unit 13.

In S150, the tag information analyzing unit 13 determines whether the tag information D received from the communication unit 12 contains layout information D1 supported by the printer 10. When the layout information D does not contain the layout information D1, or when the layout information D contains the layout information D1, but the layout information D1 is information on a print sheet other than the print sheet 30 which can be printed by the printer 10 or information described by a language incapable of being processed inside the printer 10, for example, it is determined that the tag information D does not contain the layout information D1 supported by the printer 10.

When the layout information D does not contain the layout information D1 supported by the printer 10, the process proceeds to S160, the UI unit 17 displays a predetermined error message (for example, a message indicating that "LAYOUT INFORMATION SUPPORTED BY A PRODUCT CANNOT BE ACQUIRED") on the screen 10b, and then the process returns to the IC tag detection process subsequent to S110. In addition, when the error message is displayed in S160, the user can allow the printer 10 to interrupt the flowchart and the print sheet 30 may be appropriately replaced by another sheet.

Alternatively, when it is determined that the tag information D contains the layout information D1 supported by the printer 10, the tag information analyzing unit 13 analyzes the layout information D1 and extracts predetermined information from the layout information D1 (S170).

FIG. 8 is a diagram illustrating a data structure example of the layout information D1. The layout information D1 may be described by various languages, but a language called xHTML-Print is used to describe the layout information D1 in this embodiment. Sheet size information D2 is described in a head area (which is an area surrounded by <head> to </head> in FIG. 8) of the layout information D1. The sheet size information D2 described in @page { . . . } represents the width and height (size) of the print sheet 30. In addition, the sheet size information D2 defines margins in the top, bottom, right, and left of the print sheet 30.

The head area describes sheet inside area information D3 representing locations of print areas inside the print sheet 30. The sheet inside area information D3 represents the areas A (see FIGS. 3 and 4) partitioned by the lines and the frames of the print sheet 30. In the layout information D1, names area_1, area_2, area_3, area_4, . . . are given in the four individual areas A of the print sheet 30. In FIG. 8, the sheet inside area information D3 (area_1 { . . . }, area_2 { . . . }, area_3 { }, and area_4 { . . . }) is illustrated in correspondence with the four areas A (area_1, area_2, area_3, and area_4). In the sheet inside area information D3, the number of the areas A inside the print sheet 30 is present. "top:" and "left:" defined in each of area_1 { . . . }, area_2 { . . . }, area_3 { . . . }, and area_4 { . . . } indicate the location of an origin point (which is at a left upper corner of each area) of each of the areas A on the basis of a sheet origin point O (which is at a left upper corner of a sheet, and see FIGS. 3 and 4) of the print sheet 30. "top:" is a distance in a Y direction (in a height direction of the sheet) on the basis of the sheet origin point O and "left:" is a distance in an X direction (in a width direction of the sheet) on the basis of the sheet origin point O. "width:" defined in each of area_1 { . . . }, area_2 { . . . }, area_3 { . . . }, and area_4 { . . . } indicates a width in the X direction of the areas A and "height:" is a width in the Y direction of the areas A.

Attribute information of each of the areas A is described in a body area (which is an area surrounded by <body> to </body> in FIG. 8) of the layout information D1. For example, in an area from <div class="area_2"> to </div> corresponding to the area A of area_2, an attribute (class) of an image printable in the area A, such as src="photo.jpg", is described as default description. Likewise, in an area from <div class="area_3"> to </div> corresponding to the area A of area_3, an attribute (class) of a printable image in the area A, such as src="graph.gif", is described as default description. In addition, in an area from <div class="area_1"> to </div> corresponding to the area A of area_1, a comment tag <! . . . character . . . !> is inserted as default description in an area from <span class="area_1"> to </span>. The comment tag means that the attribute (class) of an image to be printed in the area A is a character string. The comment tag is a kind of attribute information. Likewise, in an area from <div class="area_4"> to </div> corresponding to the area A of area_4, a comment tag <! . . . character . . . !> is inserted as default description in an area from <span class="area_4"> to </span>.

In S170, by analyzing the layout information D1, as described above, information such as the number of the printable areas A on the print sheet 30, the attribute (image class of characters, photos, CGs (graph), or the like) of a printable image in each of the areas A, or an amount of printable data in each of the areas A is extracted (acquired). Here, the amount of printable data corresponds to the number of printable characters in the area A, when the class of an image to be printed is a character in the area A. Even though not illustrated in FIG. 8, in the layout information D1, information defining the number of characters, such as "number of characters: 20;", may be written inside the sheet inside area information D3 (area_1 { . . . } and area_4 { . . . }) for the areas A where the class is the character, for example, in addition to the information such as "top:", "left:", "width:", and "height:". On the basis of the information defining the number of characters, the tag information analyzing unit 13 acquires the number of printable characters in each of the areas A where the class of the image to be printed is the character. In some cases, information indicating that the printed area A in the print sheet 30 is present can be written in the layout information to be analyzed in S170. However, in this embodiment, the information indicating that the printed area A is present is not written.

In S180, the tag information analyzing unit 13 stores information (also called extraction information) extracted in S170 and the layout information D1 to the memory 16.

In S190, the UI unit 17 allows the screen 10b to display a predetermined display for instructing the user to input the record data on the basis of the extraction information stored in the memory 16 in S180.

Figure 9:
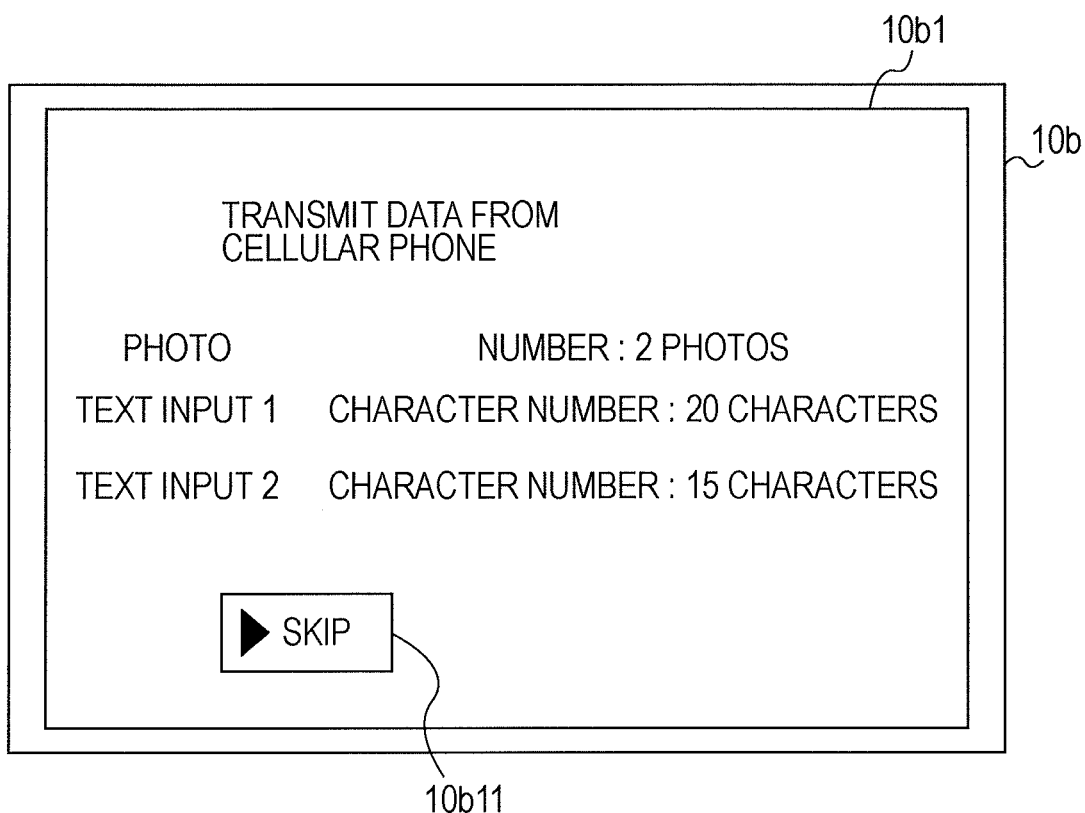
FIG. 9 is a diagram illustrating an example of an input instruction image.

FIG. 9 is a diagram illustrating an example of the input instruction image 10b1 to be displayed on the screen 10b in S190. A message that "TRANSMIT DATA FROM CELLULAR PHONE", "PHOTO NUMBER: 2 PHOTOS", "TEXT INPUT 1 CHARACTER NUMBER: 20 CHARACTERS", "TEXT INPUT 2 CHARACTER NUMBER: 15 CHARACTERS", and the like are displayed in the image instruction image 10b1. That is, the display is performed on the basis of the attribute of the record data to be input, such as "photos" or "texts", the number of data (total four data in two photos+two kinds of texts), the number of characters, and the analysis result (extraction information) obtained from the layout information D1.

When the user views the input instruction image 10b1, the user can recognize which class of data and how many data can be input now to the printer 10, when a printing process on the print sheet 30 is performed. In the example of FIG. 9, since the user can recognize that the image data of two photos and two kinds of text data individually corresponding to TEXT INPUT 1 and TEXT INPUT 2 can be input, the image data of the photos and the text data (record data) are transmitted from the information terminal 40 to the printer 10 by operation of the information terminal 40. The transmission of the record data from the information terminal 40 is realized by allowing the communication unit 42 to read various data recorded in the memory 41 by operation of the user and transmit the read data to the printer 10.

In S200, the printer 10 determines whether the communication unit 14 receives the data from the information terminal 40. When it is determined that the data is received, the communication unit 14 transfers the received data to the data analyzing unit 15.

In S210, the data analyzing unit 15 analyzes the data received from the communication unit 14, classifies the received data into character data (text data) and data (data of photos, CGs, or the like) other than the character data, and stores the character data and the data other than the character data to another storage area inside the memory 16.

In S220, the printer 10 determines whether the input of the data corresponding to all the presently printable areas A on the print sheet 30 is completed. That is, it is determined whether the image data and the character data individually corresponding to all the printable areas A on the print sheet 30 recognized as the analysis result of the layout information D1 in S170 are transmitted from the outside and stored to the memory 16. When it is determined that the image data and the character data are stored, the process proceeds to S230. The UI unit 17 determines "Yes" in S220, when the image data of two photos and the two kinds of text data are stored in a case where the input instruction image 10b1 shown in FIG. 9 is displayed. In this case, when the input of the data corresponding to all the printable areas A on the print sheet 30 is not completed but a skip button 10b11 (see FIG. 9) on the input instruction image 10b1 is selected, the printer 10 considers that the input of the data corresponding to all the printable areas A on the print sheet 30 is completed and "Yes" is determined. That is because the user sometimes desires to print some areas A of the presently printable areas A on the print sheet 30 (for example, in a case where the user desires to print a schedule in a partial area of the print sheet 30 in a schedule book). In addition, the UI unit 17 continues to display the input instruction image 10b1 until the "Yes" determination in S220.

Moreover, in S190, the UI unit 17 may display an input instruction image 10b2 in a manner described below on the screen 10b, instead of the input instruction image 10b1, on the basis of the extraction information and the layout information D1 stored in the memory 16 in S180.

Figure 10A:
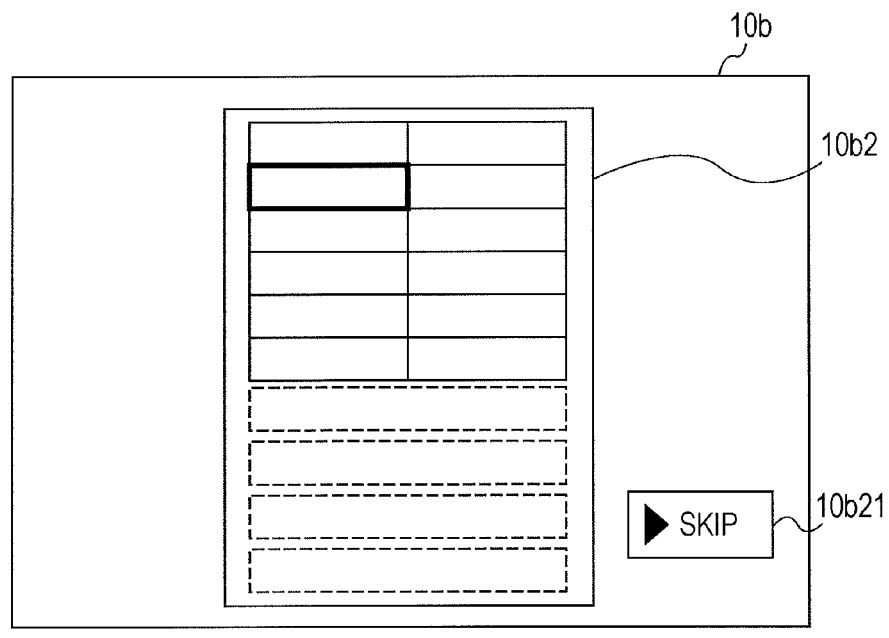
FIGS. 10A and 10B are diagrams illustrating another example of the input instruction image.

FIG. 10A is a diagram illustrating an example of the input instruction image 10b2. The input instruction image 10b2 is an image in which the UI unit 17 reproduces a location relation of each of the areas A inside the print sheet 30 on the basis of the sheet size information D2 and the sheet inside area information D3 and substantially corresponds to a reduced image before print of the print sheet 30. FIG. 10A shows the input instruction image 10b2 displayed when the print sheet 30 shown in FIG. 3 is supplied to the printer 10. The user can select each of the areas A displayed in the input instruction image 10b2 by operation of the input receiving unit 10a or the like. In FIG. 10A, one area A selected by the user among the areas A displayed in the input instruction image 10b2 is indicated by a bold frame. In this way, when one area A in the image instruction image 10b2 is selected, the UI unit 17 switches a display of the screen 10b to a detailed image 10b3 corresponding to the selected area A.

Figure 10B:
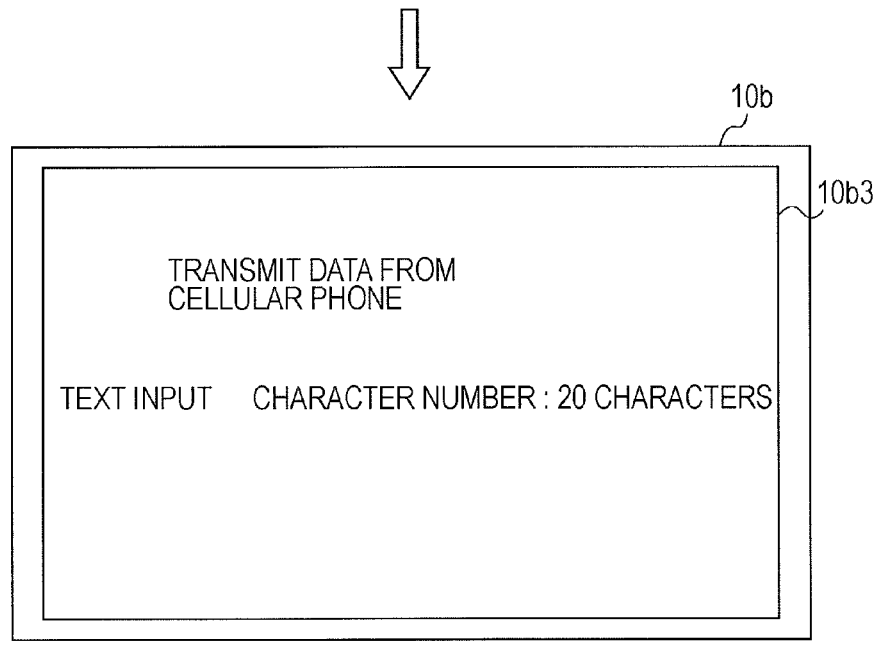

FIG. 10B is a diagram illustrating the detailed image 10b3. The detailed image 10b3 shows the class of a printable image in the area A selected in the input instruction image 10b2 and an amount of printable data (the number of characters or the like). That is, when the input instruction image 10b2 and the detailed image 10b3 are displayed, the user can clearly and visually recognize which class of data and how many data can be printed at which area of the print sheet 30, and can transmit the data from the information terminal 40 to the printer 10. In addition, as in the input instruction image 10b1, the input instruction image 10b2 is also provided with a skip button 10b21.

In S210, when the data received from the information terminal 40 is stored in the memory 16, the data analyzing unit 15 stores the data to be stored and the areas A (area_1, area_2, area_3, and area_4, . . . ) of the print sheet 30 in one-to-one correspondence with each other. The one-to-one correspondence is made on the class and order of the data transmitted by the user and the class and the order (number order of the areas) associated with the areas A. Alternatively, when the UI unit 17 displays the input instruction image 10b2 on the screen 10b, the data and the areas A of the print sheet 30 correspond to each other on the basis of the correspondence relation between the selected area A in the input instruction image 10b2 and the data transmitted to the printer 10 when the area A is selected.

In S230, the xHTML-Print data generating unit 18 generates xHTML-Print data used for performing a printing process on the print sheet 30 on the basis of the layout information D1, the character data, and the image data such as photos or CGs stored in the memory 16. Specifically, when the character data is stored in the memory 16, the xHTML-Print data generating unit 18 reads the character data and writes the read character data to the comment tag <! . . . character . . . !> (attribute information) corresponding to the area A to which the read character data correspond. For example, when the character data stored in memory 16 in correspondence with the area A of area_1 is a character string of "in-house meeting", the character string in the space from <div class="area_1"> to </div> corresponding to area_1 of the layout information D1 is rewritten to <span class="area_1"> in-house meeting </span>. The writing of this character data to the layout information D1 is performed in every character data stored for each of the areas A in the memory 16.

When the image data such as photos or CGs are stored in the memory 16, the xHTML-Print data generating unit 18 writes address information (which is information representing a storage position in the memory 16) of each of the image data to the character string (attribute information) of src" . . ." corresponding to the area A to which the image data correspond. For example, when the address of the image data stored in the memory 16 in correspondence with the area A of area_2 is "* * * *", the character string in the space from <div class="area_2"> to </div> corresponding to area_2 of the layout information D1 is rewritten to <img class="area_2" scr=* * * */>. The writing of the address information to the layout information D1 is performed in every image data such as photos or CGs stored for each of the areas A in the memory 16.

By the writing (rewriting) to the layout information D1, as described above, the xHTML-Print data are generated.

In S240, the dot data representing the print image are generated by analyzing the generated xHTML-Print data. Specifically, the xHTML-Print data generating unit 19 analyzes the sheet inside area information D3 corresponding to each of the areas A where a portion describing the attribute information in the body area of the xHTML-Print data is not in a default state, and acquires location coordinates (allocation area) of the image data (photos or CGs), which are represented by the address information written upon generating the xHTML-Print data, in a predetermined work memory. Next, the layout unit 20 converts the character data written upon generating the xHTML-Print data into corresponding font data with reference to the font data stored in a font data memory 20a, and develops the converted font data as the dot data having a predetermined character size to the location coordinates (allocation area) acquired for the character data. In addition, the layout unit 20 reads the image data from the memory 16 with reference to the address information written upon generating the xHTML-Print data, and develops the read image data as the dot data to the location coordinates (allocation area) acquired for the image data. As a result, the dot data representing one-sheet print image are generated.

In S250, the dot data generated in S240 is converted into the print data. The print data are data which define an amount of each color ink (for example, cyan (C), magenta (M), yellow (Y), black (K), and the like) in every pixel. The print data generating unit 21 generates the print data by performing known processes such as a color conversion process, a halftone process, and a rasterization process on the dot data.

In S260, the print processing unit 22 performs a printing process on the basis of the print data by control of the sheet feeding mechanism 22a and the printing mechanism 22b. In addition, at the time of starting the process of S260, the print sheet 30 is configured to be transmitted up to the print start location P2 by the sheet feeding mechanism 22a. As a result, it is possible to obtain a print in which images such as characters or photos selected by the user are exactly laid out in some or all of the areas A of the print sheet 30.

In S270, the printer 10 writes updated layout information D1' to the IC tag 31 of the print sheet 30 to be printed in S260. The updated layout information D1' refers to layout information to which information directly or indirectly representing the presence of the printed area A in the print sheet 30 subjected to the printing process is written. For example, the updated layout information D1' may be the xHTML-Print data generated from the layout information D1 in S230. In this case, the xHTML-Print data generating unit 18 transfers the xHTML-Print data generated in S230 as the updated layout information D1' to the communication unit 12 and allows the communication unit 12 to write the updated layout information D1' to the IC tag 31. When the updated layout information D1' is written to the IC tag 31, the print processing unit 22 feeds (feeds back) the print sheet 30 in a direction reverse to the sheet feeding direction by control of the sheet feeding mechanism 22a to move the print sheet 30 up to a location where the IC tag 31 substantially faces to the reader/writer 12a.

Alternatively, the xHTML-Print data generating unit 18 may generate the updated layout information D1' by adding a supplement information D4 shown in FIG. 11 to the layout information D1 stored in the memory 16 in S180. In addition, the updated layout information D1' generated by the xHTML-Print data generating unit 18 is transferred to the communication unit 12. The communication unit 12 writes the updated layout information D1' to the IC tag 31. In FIG. 11, in description of <div class="area_n"> to </div> corresponding to each of the areas A in the body area of the layout information, the supplement information D4 "#done" is added to the end of the description corresponding to the area A where the printing process is performed in S260.

The printer 10 ends the flowchart in FIGS. 6 and 7, when the updated layout information D1' is written to the IC tag 31 of the print sheet 30.

When the user again sets the print sheet 30 to the printer 10 to intend to perform the printing process, it is possible to prevent the area A having been printed from being newly printed, by writing the updated layout information D1' to the IC tag 31 of the print sheet 30 subjected to the printing process. That is, in the printing process on the same print sheet 30 after second time, the areas A where the attribute information is not in the default state or the areas A where the supplement information D4 is added are set to non-printable areas and excluded from an information extracting target, when information on the printable areas A is extracted (S170) from the layout information (the layout information updated in the previous printing process) read from the IC tag 31 and the extracted information is stored (S180).

For example, when the layout information D1' shown in FIG. 11 is set as the information extracting target and analyzed as in S170, the areas A other than the areas A (area_1 and area_2) where the supplement information D4 is added to the end of the description of <div class="area_n"> to </div> are set to the information extracting target. Then, the number of the areas A, the attribute of the printable image, an amount of printable data, and the like are extracted. Accordingly, even in the display of the input instruction of S190, an instruction of inputting the record data necessary for the printing process on the areas A other than the printed areas A (area_1 and area_2) at the time of the display is performed.

Figure 12:
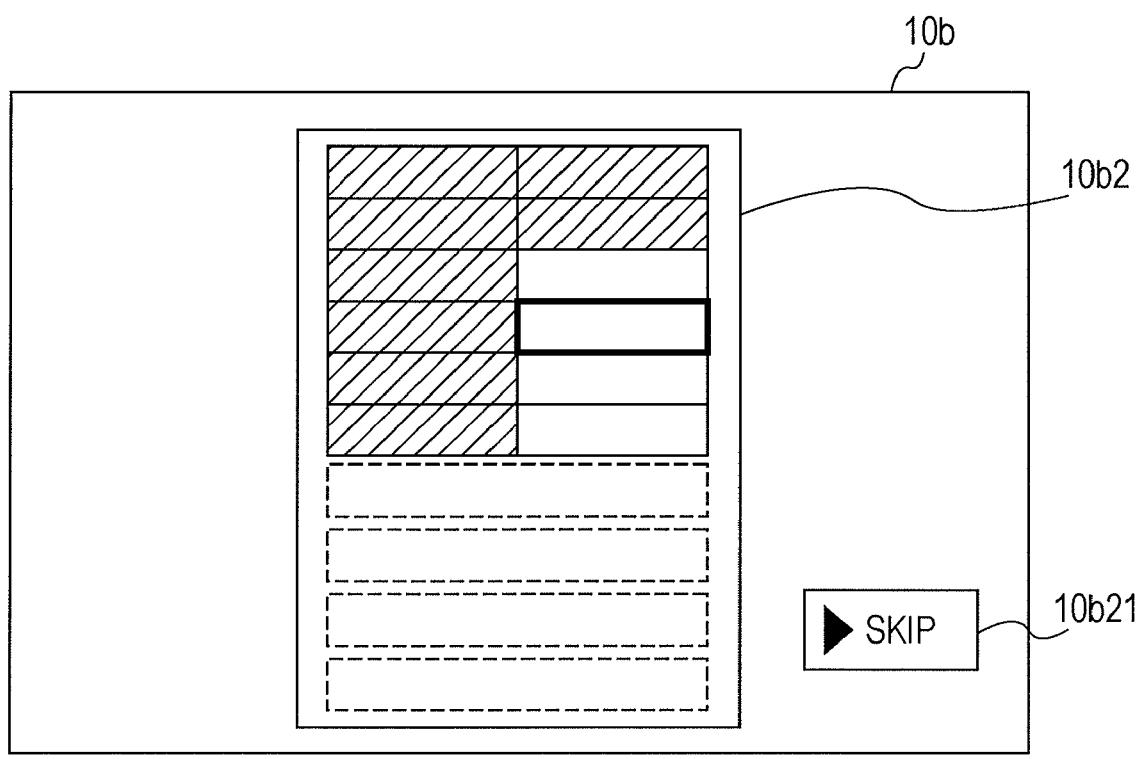
FIG. 12 is a diagram illustrating another example of the input instruction image.

FIG. 12 is a diagram illustrating an example of the input instruction image 10b2 displayed on the screen 10b by the UI unit 17 on the basis of the information extracted from the updated layout information D1'. When the input instruction image 10b2 is displayed, the UI unit 17 determines whether the printed area A is present with reference to the layout information stored in the memory 16 in S180. When the printed area A is present, a range corresponding to the printed area A inside the input instruction image 10b2 is colored with a dark color (indicated by oblique lines in FIG. 12), for example. In addition, the range is configured so that the user cannot select the range by operation of the input receiving unit 10a. With such a configuration, the user can simply distinguish the areas which have been printed from the areas which have not been printed through the screen 10b, when the same print sheet 30 is repeatedly printed in the printer 10.

According to the embodiment described above, the IC tag 31 storing the layout information including the location of the printed area inside the print sheet 30, the number of printable areas, the attribute of the image to be printed in each of the areas, and the amount of printable data in each of the areas is embedded in or attached to the predetermined location of the print sheet 30. The printer 10 includes the reader/writer 12a at the location where wireless communication with the IC tag 31 is possible during transmission of the print sheet 30 from the initial location to the print start location. In addition, the printer 10 allows the reader/writer 12a to read the layout information (tag information) from the IC tag 31, instructs the user to input the record data on the basis of the layout information, determines the arrangement of the contents (such as characters or photos) of the input record data in the print result, and performs the printing process on the print sheet 30. As a result, when the printing process is performed on the print sheet having lines and frames, the user does not need to perform the layout of the characters or the photos in consideration of the locations of the lines and the frames. Therefore, it is possible to simply obtain a print in which the characters, the photos, and the like are exactly arranged in the areas partitioned by the lines and the frames.

In this embodiment, since the layout information reflects the print sheet 30, it is not necessary to select a variation in a layout among templates provided in advance as data in the printer 10, as in a known method. Therefore, by selecting the print sheet 30 having a desired layout by the user, it is possible to obtain the print result more suitable for preference of the user.

What is claimed is:

1. A printing apparatus comprising:
a tag information reading/writing unit which reads information from an IC tag attached to or embedded in a predetermined location of a print medium and writes information to the IC tag through wireless communication with the IC tag and which reads layout information, which defines at least a location of a printable area on the print medium, from the IC tag;
a record data inputting unit which inputs record data representing contents recorded on the print medium; and
a printing control unit which performs a printing process on the print medium on the basis of print target data in which a print location of the contents represented by the record data is determined on the basis of the layout information and which updates the layout information on the basis of information directly or indirectly representing a printed area in the print medium subjected to the printing process and allows the tag information reading/writing unit to write the layout information subjected to the updating process to the IC tag.

2. The printing apparatus according to claim 1,
wherein the tag information reading/writing unit reads the layout information containing some or all of the number of the printable areas, an attribute of each of the printable areas, and an amount of printable data in each of the printable areas, and
wherein the printing apparatus further comprises a display processing unit which performs a predetermined display process of instructing input of the record data on a predetermined display screen on the basis of the layout information read by the tag information reading/writing unit.

3. The printing apparatus according to claim 2, wherein the display processing unit displays an image representing the printable areas on the print medium on the display screen on the basis of the layout information, and in response to an instruction of selecting an area in the display screen, the display processing unit additionally displays some or all of the attributes of the selected areas and the amounts of the printable data on the display screen.

4. The printing apparatus according to claim 1, wherein the tag information reading/writing unit is provided at a predetermined location on a movement passage of the print medium which includes an initial location of the print medium and a print start location of the print medium in the printing apparatus.

5. The printing apparatus according to claim 1, wherein the record data inputting unit inputs record data transmitted from an external information terminal through wireless communication with the external information terminal.

6. A printing apparatus control method comprising:
a tag information reading step of reading layout information defining at least a location of a printable area on a print medium from an IC tag attached to or embedded in a predetermined location of the print medium through wireless communication with the IC tag;
a record data inputting step of inputting record data representing contents recorded on the print medium;
a printing step of performing a printing process on the print medium on the basis of a print target data in which a print location of the contents represented by the record data is determined on the basis of the layout information; and
a tag information writing step of updating the layout information on the basis of information directly or indirectly representing a printed area on the print medium subjected to the printing process and writing the layout information subjected to the updating process to the IC tag.

7. A printing apparatus control program recorded on a non-transitory computer readable medium of a printing apparatus, the control program causing the printing apparatus to execute:
a tag information reading/writing function which reads information from an IC tag attached to or embedded in a predetermined location of a print medium and writes information to the IC tag through wireless communication with the IC tag and which reads layout information, which defines at least a location of a printable area on the print medium, from the IC tag;
a record data inputting function which inputs record data representing contents recorded on the print medium; and
a printing control function which performs a printing process on the print medium on the basis of print target data in which a print location of the contents represented by the record data is determined on the basis of the layout information and which updates the layout information on the basis of information directly or indirectly representing a printed area in the print medium subjected to the printing process and allows the tag information reading/writing function to write the layout information subjected to the updating process to the IC tag.

8. A printing system comprising:
a print medium in which an IC tag having a predetermined memory storing layout information defining at least a location of a printable area in the print medium is attached to or embedded in a predetermined location; and
a printing apparatus including:
a tag information reading/writing unit which reads information from the IC tag of the supplied print medium and writes information to the IC tag through wireless communication with the IC tag and which reads the layout information from the IC tag;
a record data inputting unit which inputs record data representing contents recorded on the print medium; and
a printing control unit which performs a printing process on the print medium on the basis of print target data in which a print location of the contents represented by the record data is determined on the basis of the layout information and which updates the layout information on the basis of information directly or indirectly representing a printed area in the print medium subjected to the printing process and allows the tag information reading/writing unit to write the layout information subjected to the updating process to the IC tag.

* * * * *